(12) United States Patent
Theuvenet et al.

(10) Patent No.: US 9,936,767 B2
(45) Date of Patent: Apr. 10, 2018

(54) DEVICE FOR CONNECTING UP LACES

(75) Inventors: Jurrien Theuvenet, Amsterdam (NL);
Timothy Luhukay, Apeldoorn (NL)

(73) Assignee: Jurrien Theuvenet, Amsterdam (NL)

( * ) Notice: Subject to any disclaimer, the term of this patent is extended or adjusted under 35 U.S.C. 154(b) by 606 days.

(21) Appl. No.: 13/996,166

(22) PCT Filed: Dec. 23, 2011

(86) PCT No.: PCT/NL2011/050898
§ 371 (c)(1),
(2), (4) Date: Oct. 4, 2013

(87) PCT Pub. No.: WO2012/087142
PCT Pub. Date: Jun. 28, 2012

(65) Prior Publication Data
US 2014/0020263 A1 Jan. 23, 2014

(30) Foreign Application Priority Data
Dec. 23, 2010 (NL) .................................. 1038472

(51) Int. Cl.
*A43C 11/00* (2006.01)
*A43C 7/00* (2006.01)
(Continued)

(52) U.S. Cl.
CPC ................ *A43C 7/00* (2013.01); *A43B 3/001* (2013.01); *A43B 3/0005* (2013.01); *A43C 7/04* (2013.01);
(Continued)

(58) Field of Classification Search
CPC .. A43C 7/00; A43C 7/005; A43C 7/02; A43C 7/04; A43C 7/06; A43C 7/08;
(Continued)

(56) References Cited

U.S. PATENT DOCUMENTS 1,371,637 A  3/1921 Meredith
2,164,123 A * 6/1939 Rio .......................... A43C 7/04
                                                24/136 R
(Continued)

FOREIGN PATENT DOCUMENTS

FR   2610799 A1   8/1988
FR   2798264 A1   3/2001
(Continued)

OTHER PUBLICATIONS

International Search Report and Written Opinion dated Jul. 17, 2012; PCT/NL2011/050898.
(Continued)

*Primary Examiner* — Katharine Gracz
(74) *Attorney, Agent, or Firm* — Ladas & Parry LLP

(57) ABSTRACT

A device for connecting up two string ends, having a base element and at least one locking element which are hinged and can be click-fitted together. The base element has at least one opening for introducing the string ends and passing them through, and an insertion groove for each string end. Each insertion groove has a way, for example barb elements, for preventing the string end from sliding in said insertion groove. The locking element has a pressure part which is configured to cooperate with the respective insertion groove in such a manner that the string end is pressed into said insertion groove and remains pressed into said insertion groove after the base element and locking element have been click-fitted together.

5 Claims, 16 Drawing Sheets

(51) Int. Cl.
*A43B 3/00* (2006.01)
*A43C 7/04* (2006.01)
*F16G 11/04* (2006.01)

(52) U.S. Cl.
CPC ......... *F16G 11/048* (2013.01); *Y10T 24/3724* (2015.01); *Y10T 24/39* (2015.01)

(58) Field of Classification Search
CPC .............. F16G 11/048; Y10T 24/3724; Y10T 24/3705; Y10T 24/3713; Y10T 24/3718; A43B 23/24; A43B 3/0031
USPC .......................................................... 36/50.1
See application file for complete search history.

(56) References Cited

U.S. PATENT DOCUMENTS

| | | | |
|---|---|---|---|
| 3,057,029 A | 10/1962 | Miller, Jr. et al. | |
| 3,138,839 A | 6/1964 | Mathes | |
| 3,296,669 A * | 1/1967 | Elder, Jr. | A43C 7/00 24/129 R |
| 3,418,733 A * | 12/1968 | Tyrrell, Sr. | A43C 7/00 24/712.2 |
| 3,537,151 A | 11/1970 | Sobel et al. | |
| 4,102,019 A * | 7/1978 | Boden | A43C 7/00 24/136 R |
| 4,715,094 A * | 12/1987 | Herdman | A43C 7/005 24/712.3 |
| 4,884,321 A * | 12/1989 | Holub | A43C 7/00 24/712.2 |
| 5,649,342 A | 7/1997 | D'Andrade et al. | |
| 5,718,021 A * | 2/1998 | Tatum | A43C 7/005 24/712.2 |
| 5,903,959 A | 5/1999 | Leonardi | |
| 6,247,214 B1 | 6/2001 | Hyde | |
| 6,381,816 B1 * | 5/2002 | Lai | A43C 7/00 24/130 |
| 6,889,407 B2 * | 5/2005 | Martin | A43C 7/00 24/136 R |
| 7,806,909 B2 * | 10/2010 | Fallin | A61B 17/0487 24/129 A |
| 8,590,115 B2 * | 11/2013 | Lumsden | A01K 1/04 24/132 R |
| 2002/0020046 A1 * | 2/2002 | Voughlohn | A43C 1/00 24/712.1 |
| 2003/0070269 A1 * | 4/2003 | Chung | A43C 3/00 24/714.6 |
| 2004/0172796 A1 | 9/2004 | King, Jr. | |
| 2006/0168784 A1 * | 8/2006 | Ahn | A43C 7/08 24/712.5 |
| 2011/0197397 A1 * | 8/2011 | Pang | A61M 5/1418 24/132 R |

FOREIGN PATENT DOCUMENTS

| | | |
|---|---|---|
| JP | 11-514899 A | 12/1999 |
| JP | 2006-136672 A | 6/2006 |
| JP | 2006-204602 A | 8/2006 |
| TW | M316640 | 8/2007 |
| WO | 97/03423 A1 | 1/1997 |
| WO | 97/13423 A1 | 4/1997 |
| WO | 01/19212 A1 | 3/2001 |
| WO | 2004/080226 A1 | 9/2004 |
| WO | 2004/100694 A1 | 11/2004 |

OTHER PUBLICATIONS

Netherlands Search Report; Patent Application 1038472.
Japanese Office Action dated May 27, 2016; Appln. No. 2013-546057.

* cited by examiner

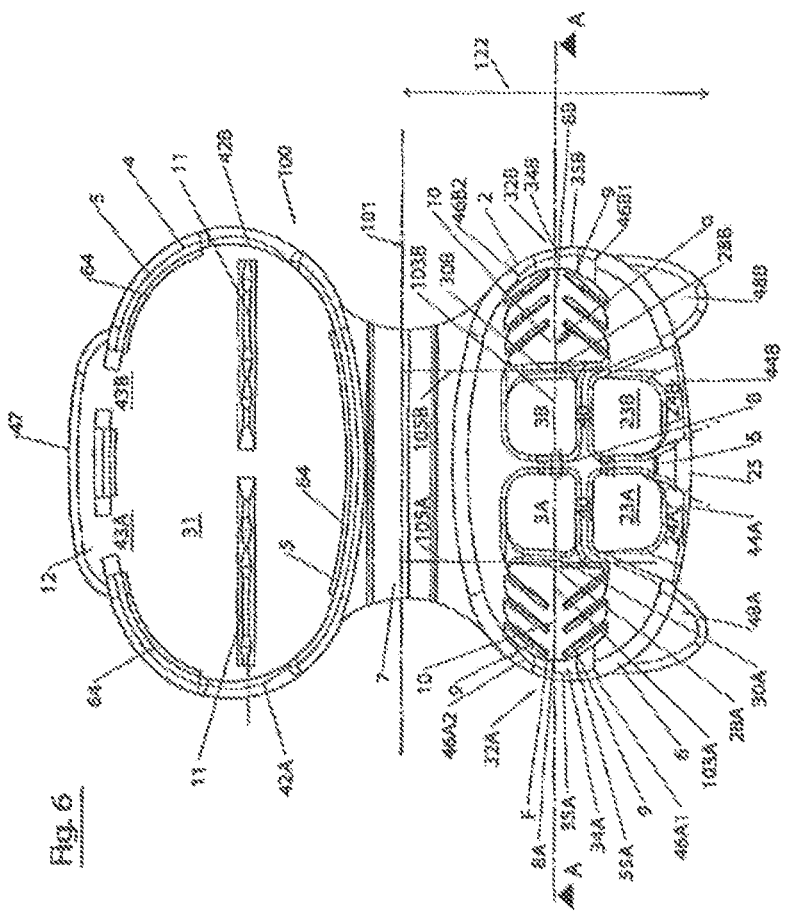

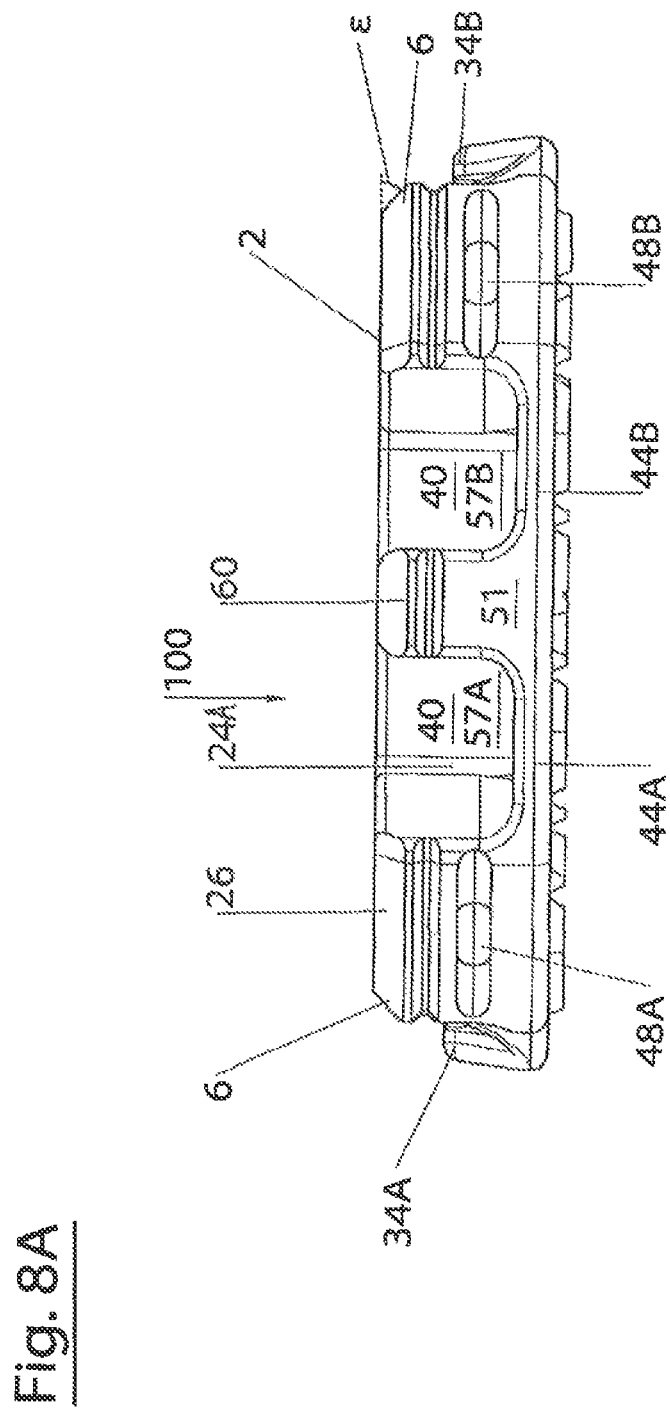

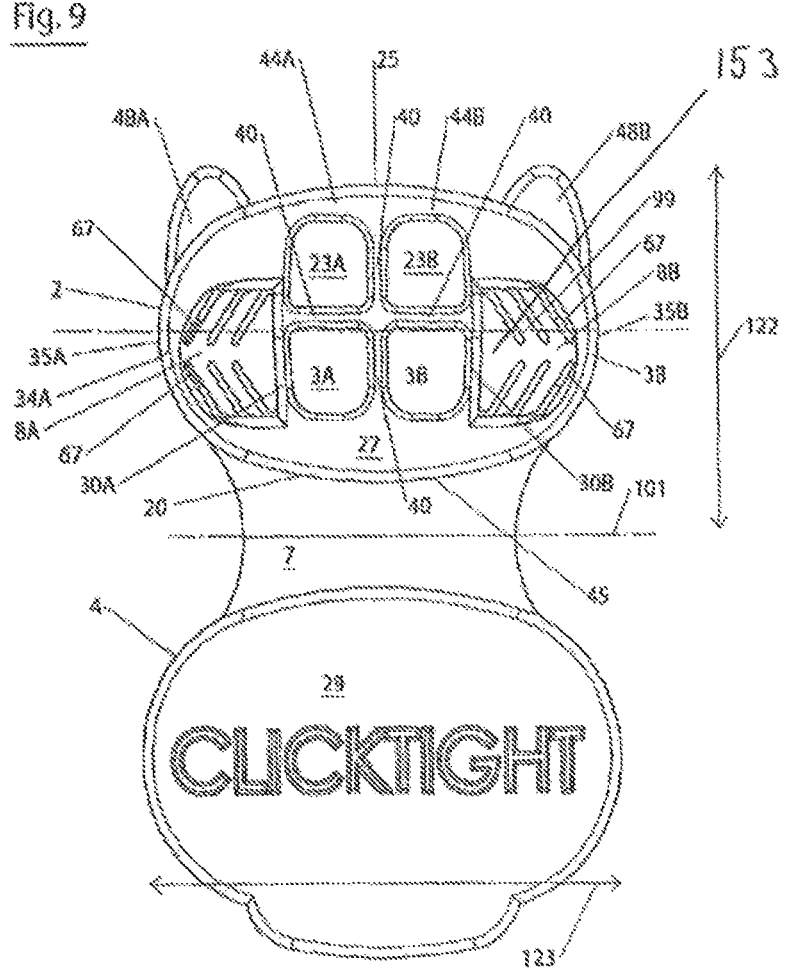

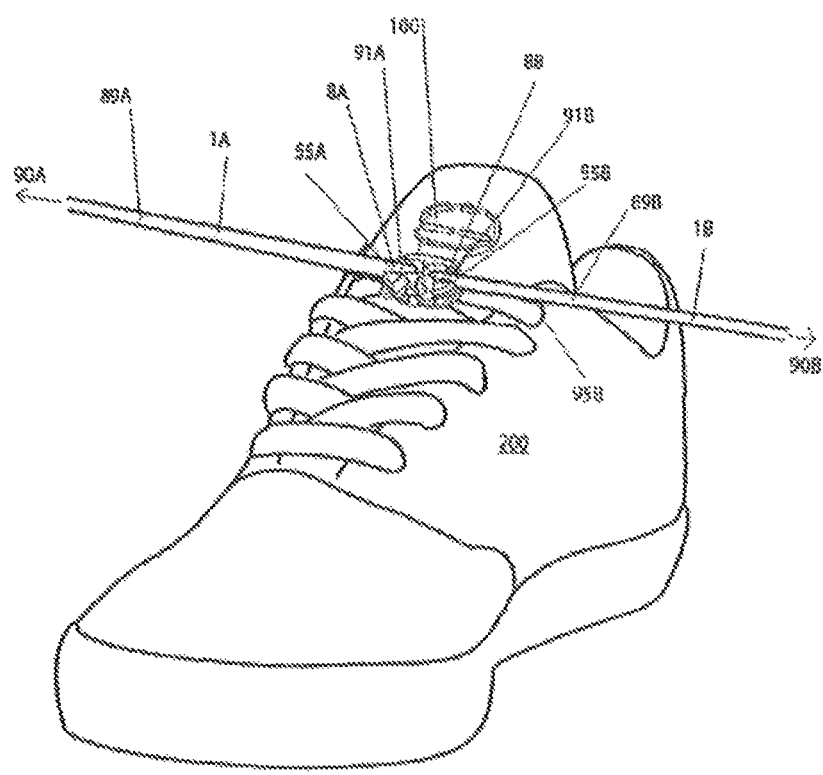

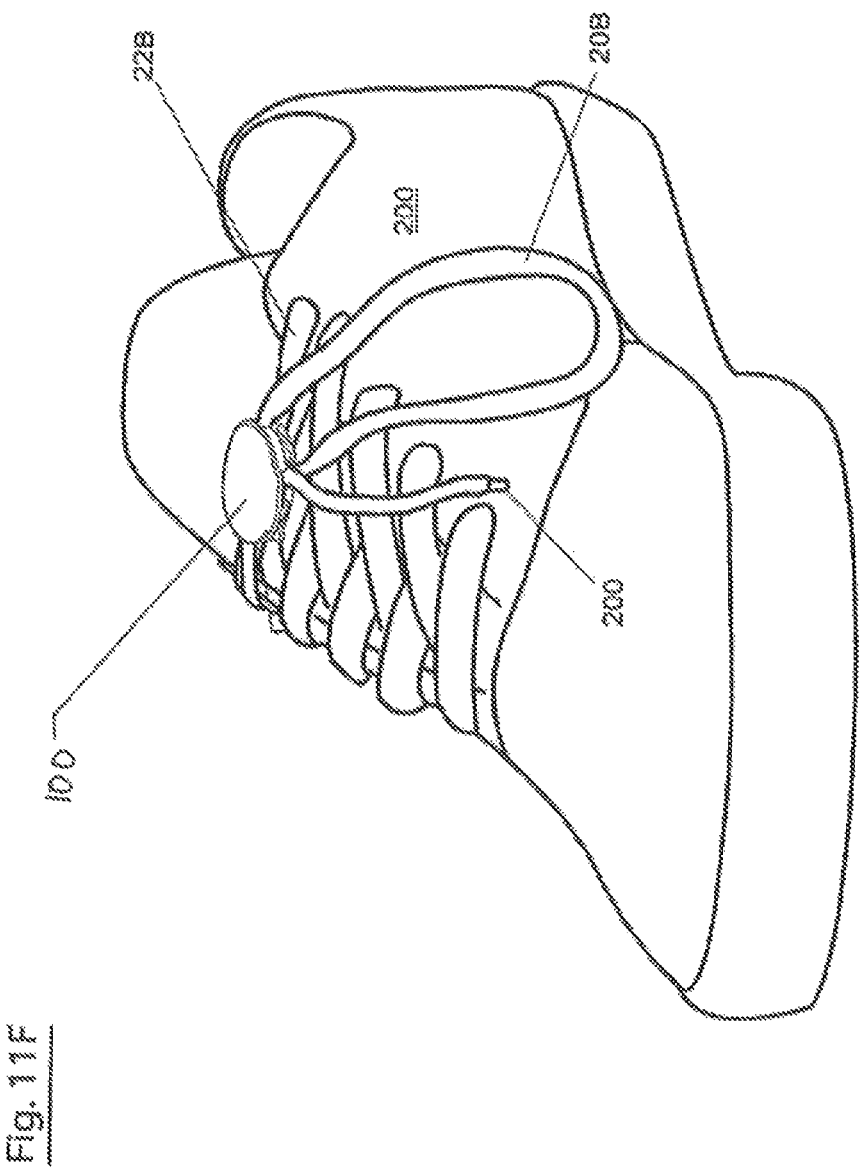

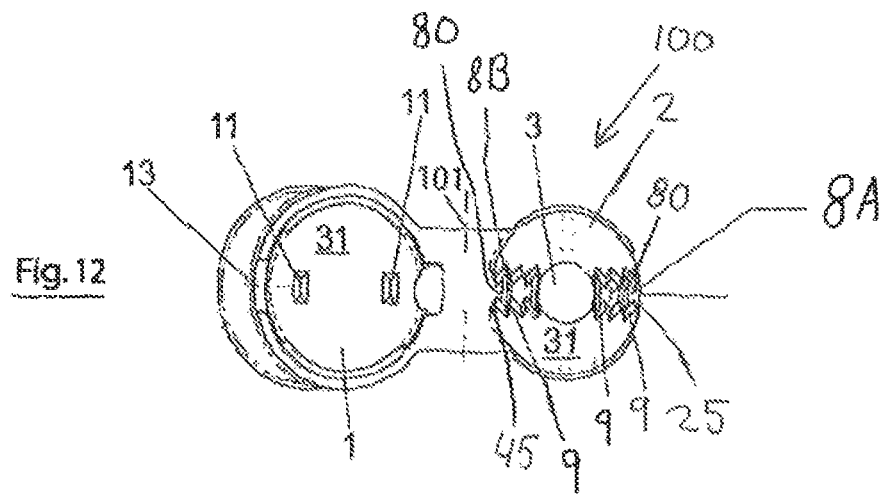
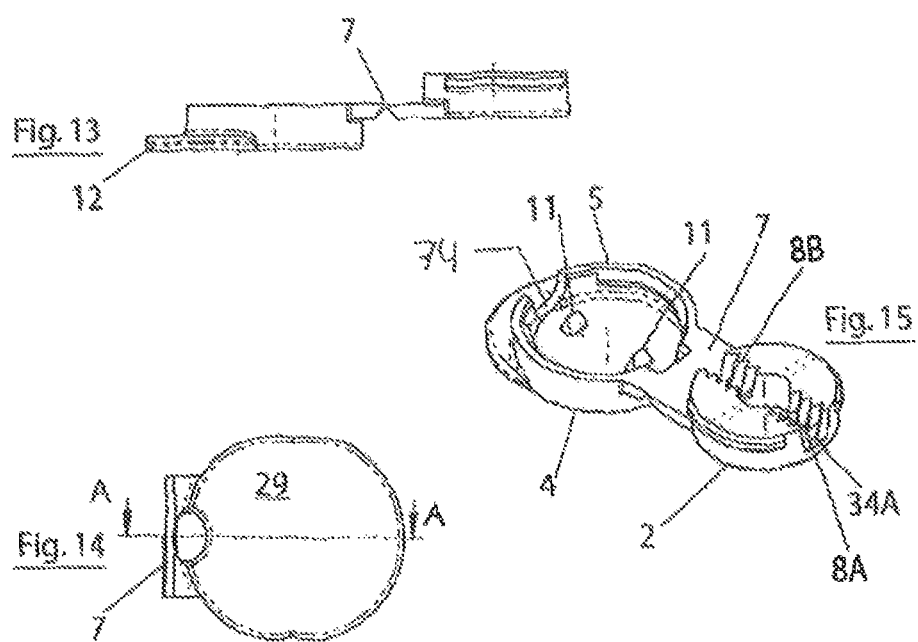
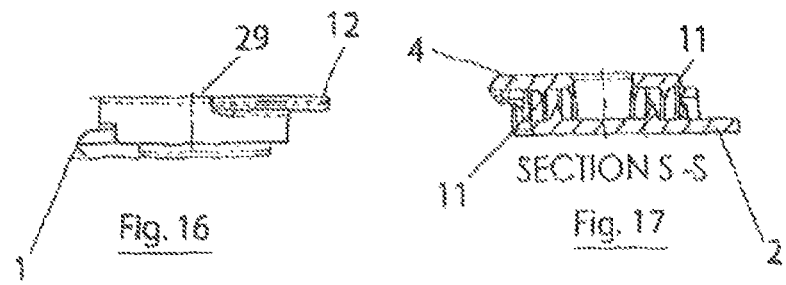

DEVICE FOR CONNECTING UP LACES

The invention relates to a device for connecting up two string ends, which device comprises a base element which is configured such that the string ends can be introduced and at least one locking element which is configured to lock the string ends by cooperating with the base element.

The strings are in particular, but by no means exclusively, (shoe)laces. However, the invention can be used mutatis mutandis for connecting up other string ends, for example of clothing, in sailing, on tents, sleeping bags, etc. In the following text, the terms string end(s) and lace end(s) will both be used.

It is an object of the invention to provide a replacement for the conventional lace bow, in other words to remove the necessity to connect up string ends by means of a lace bow, as a result of which shoes and the like can be tied in a simpler and in addition more reliable manner, which is important for sports shoes and also for children's shoes, among other things.

It is a further object of the invention to provide a device for connecting up two lace ends which, in addition, offers the possibility of housing an identification chip.

Yet another object of the present invention is to provide that less lace material is needed for fastening shoes and the like, namely by rendering the tying of a lace bow—which requires a relatively long lace—superfluous.

A system which is related to the device according to the invention is known from WO0119212. However, contrary to the system of the present invention, the system illustrated therein is not intended for connecting up two lace ends, but is intended as a device for maintaining or securing a conventional lace bow which has been tied by the user.

The known device aims to prevent the (conventional) lace bow from becoming undone and the user—in this case assumed to be mainly children—stumbling as a result. The lace ends are tied in a conventional manner on top of the base element (1), following which a locking element (5) which is hingedly connected to the base element is click-fitted thereon by means of a clip arrangement (7 and 8). In this case, the bows and loose ends of the lace bow are clamped between mating teeth on the base element and the locking element, so that the bow knot cannot come loose.

According to the invention, the device comprises a base element which is configured such that the string ends can be introduced and at least one locking element which is configured to lock the string ends by cooperating with the base element.

The device according to the invention differs from the system known from WO0119212 in that, in the device according to the invention, the loose lace ends are introduced into the device and tightened (via, that is to say guided by, the device), following which the tightened lace ends are then—without having been tied—accommodated in the device and fixed. It is therefore in particular an object of the device according to the invention to replace the conventional lace bow, that is to say to offer a modern alternative therefor.

Preferably, the base element and the at least one locking element can be click-fitted together, that is to say they are configured to be click-fitted, for example, in, on or over one another.

Likewise, the base element and the at least one locking element are preferably hingedly connected to one another and the base element and the at least one locking element together preferably form an integrated unit.

The base element preferably has at least one opening for introducing the string ends and passing them through. These preferred measures are known per se from WO0119212, but, as has been stated above, in a system which has an object which differs from the object of the present invention.

In a preferred embodiment, the base element has an insertion groove for each string end for inserting said string end. Preferably, each insertion groove comprises means for preventing the string end from sliding in said insertion groove, for example due to said means having one or more serrated or barb elements. Furthermore, the at least one locking element has a pressure part which is configured to cooperate with the respective insertion groove in such a manner that the string end is pressed into said insertion groove and remains pressed into said insertion groove after the base element and locking element have been click-fitted together. If desired, the pressure part may (also) comprise means for preventing the string end from sliding in said insertion groove, for example in the shape of serrated or barb elements.

In an embodiment, the means for preventing the string ends from sliding in the insertion grooves are flexible, and in particular configured as flexible plate parts. In an embodiment, the means are resilient. In an embodiment, the means for preventing the string ends from sliding in insertion grooves have an edge which is straight. In an embodiment, the means for preventing the string ends from sliding in insertion grooves have an edge which extends substantially at right angles to the top side and bottom side of the base element. In an embodiment, the means for preventing the string ends from sliding in insertion grooves extend over a distance to below a bottom part of the insertion grooves.

In an embodiment, the two insertion grooves 8A, 8B extend into the base element, with the at least one opening being situated between the two insertion grooves.
In an embodiment, the insertion grooves are recessed with respect to a top side of the base element.

In an embodiment, the at least one opening and the insertion grooves 8A, 8B are formed in such a way that the lace parts, during use, describe a curve around respective curve axes which extend substantially parallel to the top surface of the base element.

In an embodiment, the curve axes extend substantially at right angles to the hinge pin.

In an embodiment, the insertion grooves 8A, 8B are formed in such a way that they accommodate the lace parts during use, so that the lace parts extend through the insertion grooves 8A, 8B and are situated between the base element and the locking element.

In an embodiment, the two insertion grooves, in top view, extend at an angle β of less than 15 degrees with respect to one another, and are in particular in line with one another.

In an embodiment, the at least two insertion grooves, in top view, both extend at an angle of less than 10 degrees with respect to a hinge pin or a hinged connection between the base element and the locking element.

In an embodiment, the device comprises at least two openings and two insertion grooves, each insertion groove 8A, 8B being associated with a respective opening, with the openings being situated substantially between the two insertion grooves.

In an embodiment, the insertion grooves extend as far as the sides of the base element and, together with the locking element, define passages to the outside there.

In an embodiment, at least a part of the insertion grooves has an open bottom, in which the base element comprises at least two bridge parts which are recessed with respect to a top side of the base element, with the bridge parts forming a passage from the at least one opening to the respective insertion grooves.

In an embodiment, the two insertion grooves comprise a relatively deep part and a relatively shallow part.

In an embodiment, the two insertion grooves comprise a part without a bottom between the relatively deep part and the relatively shallow part.

In an embodiment, the base element comprises bridge parts which, together with the locking element, define the passages, the bridge parts being recessed with respect to the bridge parts, and the bridge parts, bridge parts and the pressure part of the locking element being formed in such a manner that, during use, the lace parts are curved over an angle of more than 180 degrees around the respective bridge parts.

In an embodiment, the device furthermore comprises four openings in the base element which are associated with four respective insertion grooves in the base element.

In an embodiment:
two openings in the base element are associated with respective insertion grooves which extend from the respective openings to the sides of the base element, and
two openings in the base element are associated with respective insertion grooves which extend from the respective openings to substantially the front side of the base element.

In an embodiment, the insertion grooves 8A,8B extend substantially at right angles to a hinge pin.

In an embodiment, an opening is formed in an area where the hinge is connected to the locking element, which opening, in the closed position, forms a passage opening during use for a lace part which, coming from an insertion groove which extends towards the hinge, extends through the opening to the outside.

The invention also relates to a shoe provided with a device according to one of the preceding claims.

BRIEF DESCRIPTION OF THE FIGURES

Below, the invention will be explained in more detail by means of two exemplary embodiments and with reference to some figures, in which:

FIG. 6 shows a top view of another embodiment of the invention in the open position.

FIG. 8A shows a front view of the embodiment from FIG. 6 in the open position.

FIG. 9 shows a bottom view of the embodiment from FIG. 6 in the open position.

FIGS. 11B, 11C, 11D, 11E and 11F show isometric views of the embodiment from FIG. 6 during use.

FIG. 12 shows a top view of yet another embodiment in the open position.

FIG. 13 shows a side view of the embodiment from FIG. 12 in the open position.

FIG. 14 shows a top view of the embodiment from FIG. 12 in the closed position.

FIG. 15 shows an isometric view of the embodiment from FIG. 12 in the open position.

FIG. 16 shows a side view of the embodiment from FIG. 12 in the closed position.

FIG. 17 shows a cross section of the embodiment from FIG. 12 in the closed position along the line A-A in FIG. 14.

DETAILED DESCRIPTION OF THE EMBODIMENTS

First Embodiment

Figure 1:
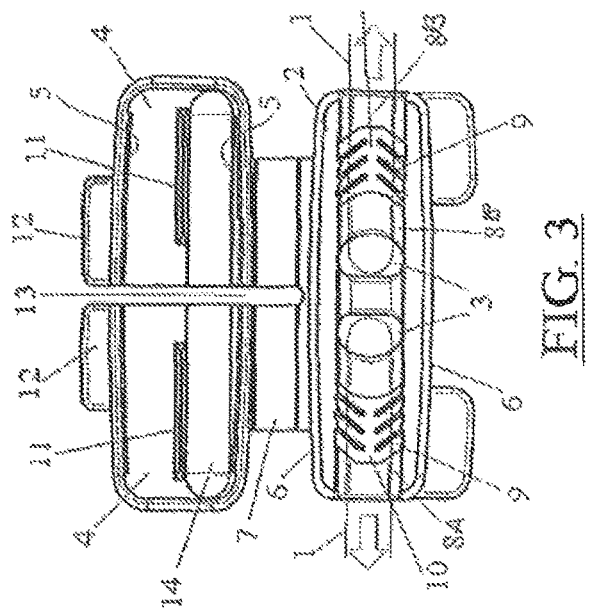
FIG. 1 shows a top view of a preferred embodiment of the device according to the invention in the open position.
Figure 2:
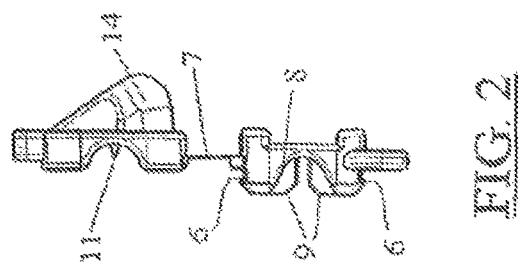
FIG. 2 shows a side view of the same exemplary embodiment.

FIGS. 1 and 2 thus show a preferred embodiment of a device 100 for connecting up two lace ends 1, which device 100 comprises a base element 2 which is configured such that the lace ends 1 can be introduced via openings 3, and a locking element 4 which is configured such that, by cooperating with the locking elements 4, the lace ends 1 are locked in the base element 2. The base element 2 and the locking element 4 can be click-fitted together, that is to say they are configured to be click-fitted over one another by means of edges 5 and 6 which interact with one another. The base element 2 and the locking element 4 are more or less hingedly connected to one another via a thin connecting part 7 via which the base element 2 and the locking element 4 form an integrated unit. The unit may be produced by means of injection-moulding, for example, polypropylene or another thermoplast.

The base element 2 has one or (as illustrated here) two openings 3 for introducing the lace ends 1 and passing them through.

For each lace end 1, the base element 2 has an insertion groove 8 for inserting said lace end 1. In the illustrated embodiment, the insertion groove 8 runs completely in the longitudinal direction of the base element 2. Each insertion groove 8 comprises means for preventing the lace end 1 from sliding in said insertion groove 8. In the illustrated preferred embodiment, said means comprise a number of resilient, barb elements 9. Said barb elements 9 are resilient due to the fact that they can move freely on the bottom and top side: by means of an opening 10 provided in the rear wall of the base element 2, the elements 9 are also movable on the rear side. The resilience of the barbs ensures that laces having a different thickness and shape can be locked in/clamped.

The locking element 4 has a pressure part 11 which is configured to cooperate with the respective insertion groove 8 in such a manner that the lace end 1—after both lace ends 1 have been pulled taut by the user via, that is to say guided, by the openings 3 in mutually opposite directions (see arrows), as a result of which the relevant shoe is tightened around the foot of the user 5—is pressed into said insertion groove 8 and remains pressed into said insertion groove 8 after the base element 2 and locking element 4 have been click-fitted together, with the lace ends 1 being pressed between the resilient, barb elements 9, thus preventing the lace ends from being able to slide back again. The pressure parts 11 may also comprise means, for example teeth, in order to prevent the lace ends 1 from sliding in the insertion groove 8.

In order to fasten his/her shoelaces, the user thus inserts the two lace ends 1 into the openings 3 of the base element 2, pulls the laces tight by pulling the lace ends 2 which are guided through the base element 2 via the openings 3 in opposite directions (see arrows), as a result of which the laces 1 are tightened (the base element 2 is in this case subject to tensile load) and the relevant shoe is tightened around the foot of the user. While the user keeps the laces in the tightened position, the user closes the locking element 4 by pressing on its top side and/or on the projecting operating lip 12.

Figure 3:
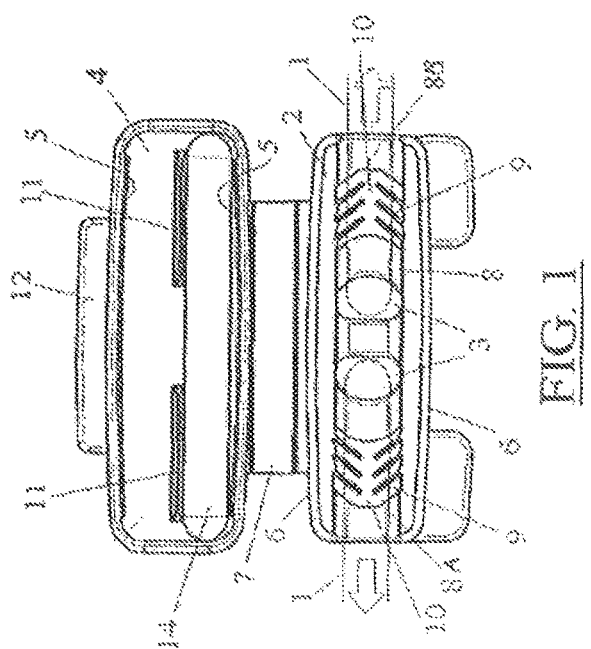
FIG. 3 shows a top view of an alternative embodiment of the device shown in FIG. 1.

The embodiment illustrated in FIG. 3 has two locking elements 4 instead of one, namely via the slot 13, as a result of which both locking elements 4 can be hinged independently from one another and can be click-fitted onto the base element 2 or can be released therefrom, respectively. In practice, there may be a preference for an embodiment having two locking elements 4 instead of one, as with said embodiment having two locking elements 4, it is possible for the user first to secure one lace end 1 and then to secure the other lace end 1 by pressing down and click-fitting the respective locking element 4.

In order to release the lace ends 1, the locking element 4 or the locking elements 4, respectively, are unclicked from the base element 2, either by pulling the operating lip(s) 12 upwards and/or pulling the lace ends 1 upwards.

An RFID tag which is, for example, tubular may be housed in a cavity 14. It should be noted that the shape of RFID tags may differ (for example flat), so that, in practice, the shape and/or position of the housing 14 may also differ from that illustrated in the figures.

Figure 4:
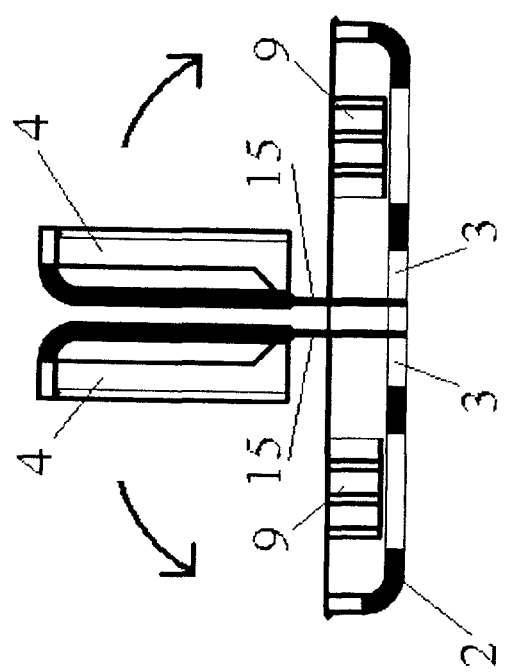
FIG. 4 shows a cross section of an alternative embodiment.

FIG. 4 shows a modification of the configuration from FIG. 3 in which the locking elements 4 are not connected to the base element 2 by means of a (bending) hinge in the longitudinal direction, but are each connected by means of a hinge construction which is at right angles to the longitudinal direction and is formed by thin-walled (hinged/flexible) connecting parts 15 between the base element 2 and the locking elements 4. The connecting parts 15 are similar to the thin-walled connecting part 7 in the configurations from FIGS. 1, 2 and 3. However, the connecting parts 15 are at right angles to the longitudinal axis of the base element 2, while the connecting part 7 or the connecting parts 7 (in FIG. 3) extends or extend, respectively, in the longitudinal direction.

Figure 5D:
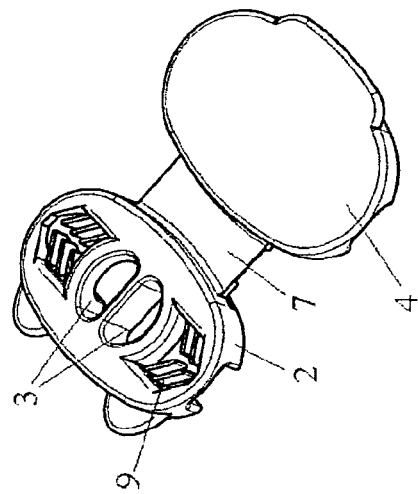
FIGS. 5a-d show different views of a preferred design which corresponds to the exemplary embodiment illustrated in FIGS. 1 and 2.
Figure 5C:
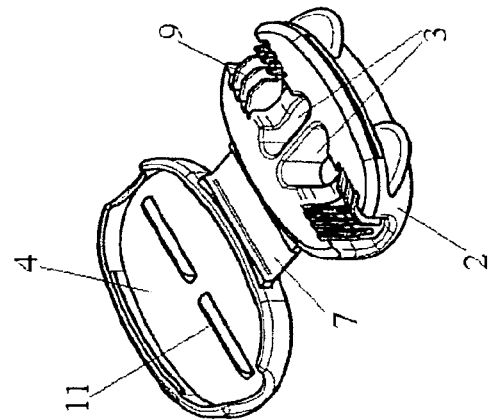
Figure 5B:
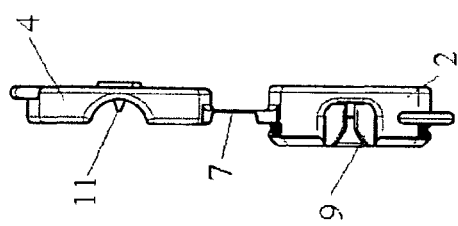
Figure 5A:
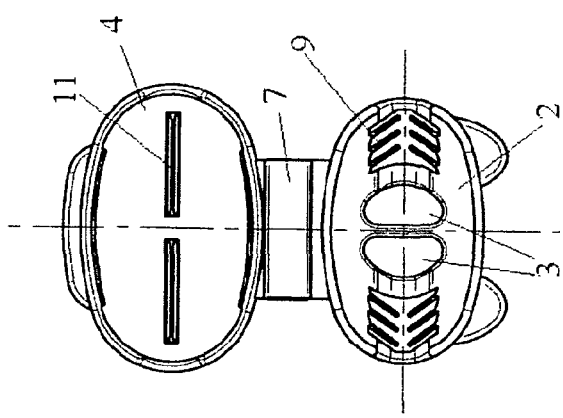
Figure 7:
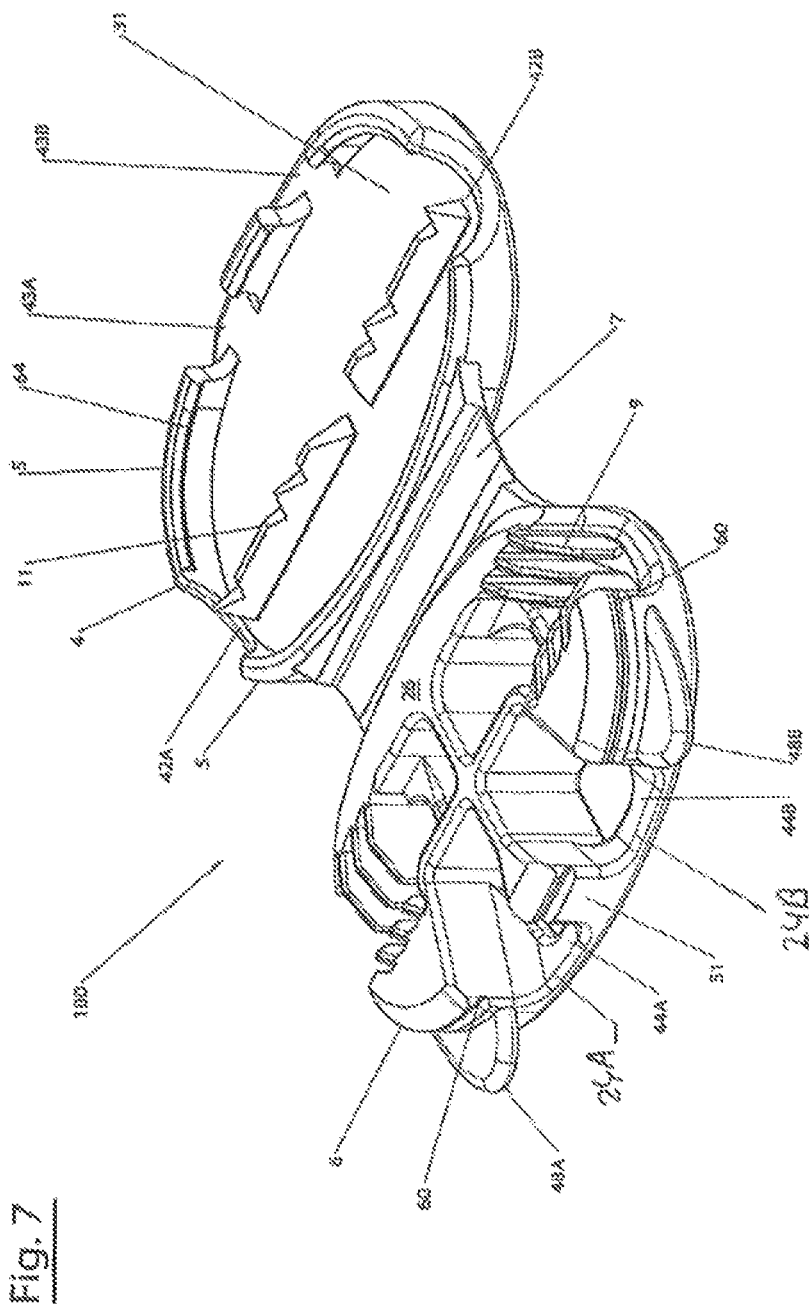
FIG. 7 shows an isometric view of the embodiment from FIG. 6 in the open position.

FIGS. 5a-d show different views of a preferred design which roughly corresponds to the exemplary embodiment from FIGS. 1 and 2. The reader is referred to the description of FIGS. 1 and 2 for the function and operation of the various parts. FIG. 5a shows a top view of the base element 2 and the locking element 4 in the open position; FIG. 5b shows a side view. FIGS. 5c and 5d show the same embodiment in the open position in perspective from above (FIG. 5c) and from below (FIG. 5d), respectively. In this case, the lace openings 3, the connecting part 7 and the barb parts 9 can also clearly be seen.

Second Embodiment

A further embodiment of the device 100 is shown by means of FIGS. 6-11A. The device 100 has a substantially oval shape, with the locking element being connected to a long side 20 of the substantially oval base element 2 via a hinged connection 7. The base element 2 has a front side 25 and a rear side 45. The hinged connection 7 is connected to the rear side 45. The hinged connection 7 is formed by a film hinge. The hinge extends parallel to a central longitudinal axis 99 (see FIG. 9) of the base element 2. The device comprises only a single hinge 7.

The base element 2 and the locking element 4 are substantially flat, i.e. they have a respective height 120, 121 (see FIG. 11A) which is relatively small compared to the length 122 and width 123 (see FIG. 9). In an embodiment, the device 100 has a width 123 of 20-30 mm, a length 122 of 15-20 mm and a total height in the closed position of 4-9 mm.

The base element 2 comprises four openings which are configured for inserting a lace, two openings 3A, 3B for a first passing-through and two openings 23A, 23B for a second passing-through of the left lace and the right lace, respectively.

The base element 2 furthermore comprises insertion grooves 8A, 8B which extend from the respective openings 3A, 3B to the sides 35A, 35B of the device.

The insertion grooves 8A, 8B in the base element 2 accommodate the lace parts which are situated in the insertion grooves 8A, 8B and between the base element 2 and the locking element 4 during use. In top view, the insertion grooves 8A, 8B extend at an angle of less than 10 degrees with respect to a hinge pin 101 and, in an embodiment, are parallel to the hinge pin 101, see FIG. 6, in top view.

The base element 2 furthermore comprises insertion grooves 24A, 24B which extend from the respective openings 23 to a front side 25 of the base element. The grooves 24A, 24B are relatively short. The insertion grooves 24A, 24B extend at an acute angle δ (see FIG. 6) to one another, in particular at an angle of approximately 30-60 degrees. The grooves are formed by bridge parts 44A, 44B which are recessed with respect to a top side 26 of the base element 2. The groove 24A extends at an acute angle to the insertion groove 8A. The groove 24B extends at an acute angle to the groove 8B. The bridge parts 44A, 44B may have sharp upper edges, but in this embodiment the upper edges are smooth.

The openings 3A,3B are closer to the hinged connection 7 than the openings 23A, 23B.

The purpose thereof will be explained later. The openings 3A,3B, 23A, 23B are substantially square with rounded corners, but they may also have a substantially round or oval shape. The openings 3A,3B, 23A, 23B have a smooth periphery through which a lace can readily pass, i.e. without recesses to the inside or to the outside which could cause a lace part to become trapped.

The sloping edge 6 is at an angle ϵ of 30-70 degrees to the top side 26 of the base element 2, see FIG. 8A, in which angle ϵ is indicated.

Bridge parts 28A, 28B are recessed with respect to the top side 26 over a depth 37 and form respective grooves 30A, 30B which extend between the respective openings 3A, 3B and the respective insertion grooves 8A, 8B. The bridge parts 28A, 28B may have acute upper edges, but in this embodiment, the upper edges are smooth.

The barb elements 9 are configured as flexible plate parts. In total, there are six barb elements 9 in insertion groove 8A and six barb elements 9 in insertion groove 8B. The barb elements 9 extend at an acute angle α of approximately 50-70 degrees to the insertion grooves 8A,8B. It will be clear to someone skilled in the art that the number of barb elements 9 can be varied within certain boundaries.

The barb elements 9 form constrictions of the insertion grooves 8A, 8B, i.e. the gap 110 (see FIG. 11A) between opposite edges 93 of the barb elements 9 is smaller than a width 112 (see FIG. 11A) of the insertion grooves 8A, 8B.

The barb elements 9 have edges 93 (see FIGS. 8B and 11) which extend substantially at right angles to the top side 26 of the base element 2 and at right angles to the groove axes 103A, 103B. See angles γ in FIG. 8B. The edges 93 also extend at right angles to the hinge pin 101, to the axes 103A, 103B of the insertion grooves 8A, 8B (see angle FIG. 6), and to a central longitudinal axis 99 (see FIG. 9) of the base element 2. In use, the barb elements 9 exert forces F (see FIG. 6, left group 32A) on the lace, which forces F are parallel to the top surface 26 of the base element.

Figure 8B:
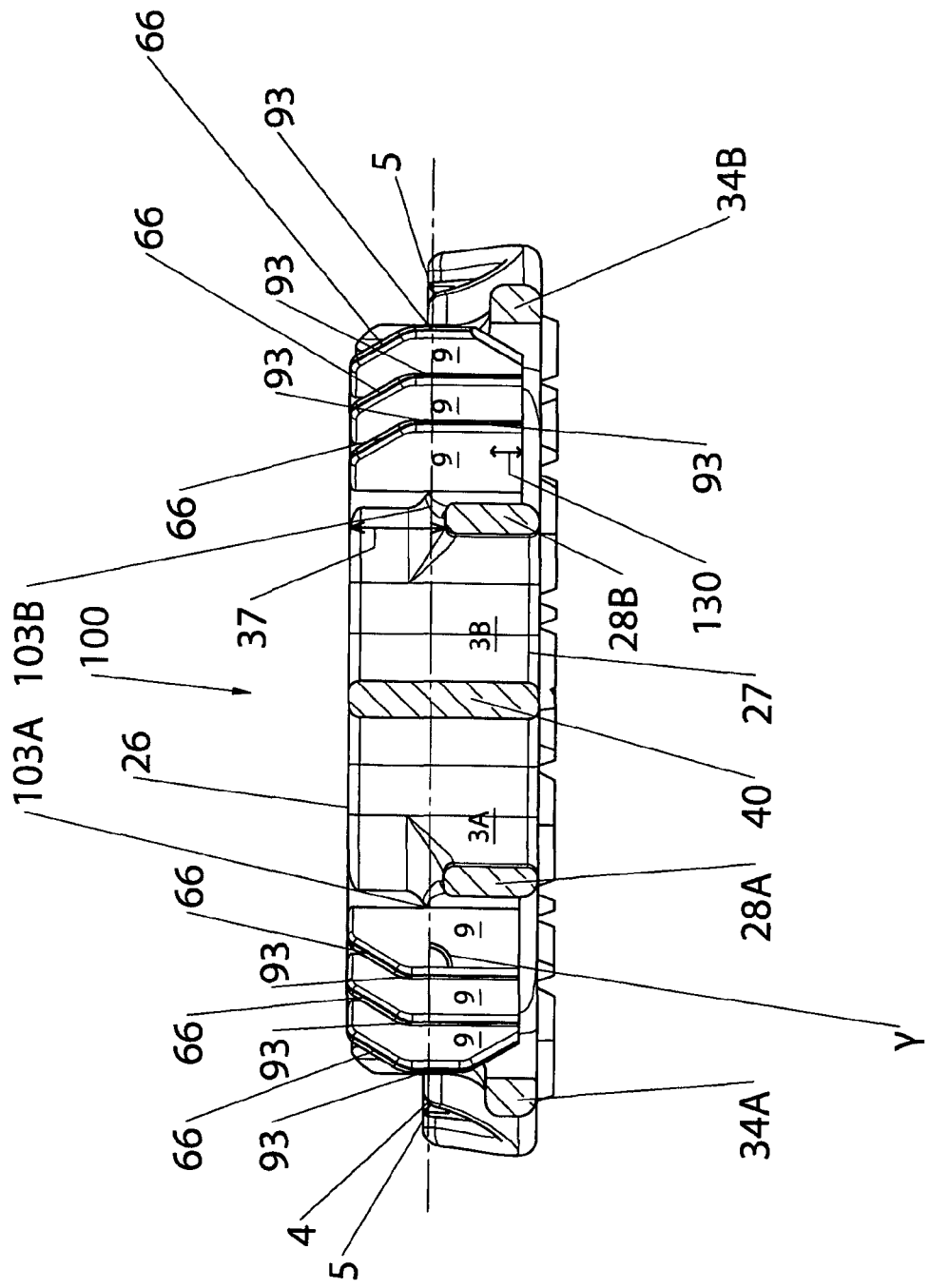
FIG. 8B shows a cross section in front view along the line A-A in FIG. 6.

The barb elements extend over a distance 130 further downwards than the top side of the bridge parts 34A, 34B, see FIG. 8B. This prevents the lace from becoming caught on the bottom side of the barb elements 9 during use and thus from becoming damaged.

At the location of the barb elements, the insertion grooves 8A, 8B are open on the bottom side.

The plate parts are resilient. On one side, the plate parts are connected to the base element 2. There are two groups of plate parts 9, a left group 32A and a right group 32B. The left group 32A and right group 32B point away from one another, i.e. the forces F which are exerted on the lace by the barb elements 9 of the left group 32A are directed to the left and the forces which are exerted on the right lace by the barb elements 9 of the right group 32b are directed to the right.

In top view, the grooves 30A and 30B are at an angle β of less than 15 degrees with respect to one another. In this embodiment, in top view, the insertion grooves 8A and 8B are in line with one another. The insertion grooves 8A, 8B, 30A, 30B extend parallel to the hinged connection. The insertion grooves 8A, 8B extend parallel to the longitudinal axis 99 (see FIG. 9) of the base element 2.

The base element furthermore has bridge parts 34A, 34B which are recessed with respect to the top side 26 of the base element 2 over a depth 38. The bridge parts 34A, 34B extend along the left edge 35A and the right edge 35B of the base element 2. The bridge part 34A extends between upright edges 46A1, 46A2 and the bridge part 34B extends between upright edges 46B1 and 46B2.

The bridge parts 34A, 34B may have sharp upper edges, but in this embodiment their upper edges are smooth.

The insertion grooves 8A, 8B are defined in such a manner that they extend between the openings 3A,3B and the edges 35A, 35B of the base element 2. The insertion grooves 8A, 8B thus also comprise the bridge parts 28A, 28B, 34A, 34B. The bridge parts 28A, 28B, 34A, 34B form bottom parts of the insertion grooves. The bottom of the insertion grooves 8A, 8B is thus closed at the ends and the insertion grooves are open between the ends on the bottom side.

Central bridge parts 40 form a cross in the base element 2.

The locking element 4 has a top side 29 and a bottom side 31. The edge 5 extends around the largest part of the periphery of the locking element. The locking element 4 has recesses 42A, 42b in the edge 5. The recesses 42A, 42B are situated on the end sides of the oval shape, i.e. on the highly curved sides of the oval locking element 4.

When the locking element 4 is shut, the grooves 42A, 42B are situated over the bridge parts 34A, 34B and, together with the upright edges 46A1, 46A2, 46B1, 46B2, form openings 55A, 55B or passages through which the laces extend to the outside.

The locking element 4 has recesses 43A, 43B in its edge 5. The recesses 43A, 43B are situated on the same long side 47 of the oval locking element, opposite the hinged connection.

A projection 49 is situated between the recesses 43A, 43B. During use, the projection 49 cooperates with a projection 51 on the base element 2 in order to keep the lace parts which emerge from the passages 57A, 57B (see FIG. 8A) apart. The projection 51 is shaped in such a manner that it guides the laces in the grooves 24A, 24B.

When the locking element 4 is shut, the recesses 43A, 43B are situated over the bridge parts 44A, 44B and, together with the upright edges 47, form openings 57A, 57B through which the laces extend.

Referring to FIG. 9, the bottom side of the device is illustrated. As can be seen, the base element is relatively flat on the bottom side. The bridge parts 28A, 28B, 34A, 34B, 40, 44A, 44B are substantially in the same plane as the bottom side 27 of the base element 2. A part of the insertion groove has an open bottom 153.

The top side 29 of the locking element 4 is flat and forms a suitable surface for any word mark, illustration and the like and can serve as a basis for technical applications, such as LEDs, RFIDs, etc. and other technical applications and embellishments. These may have a two-dimensional or three-dimensional shape.

Figure 11A:
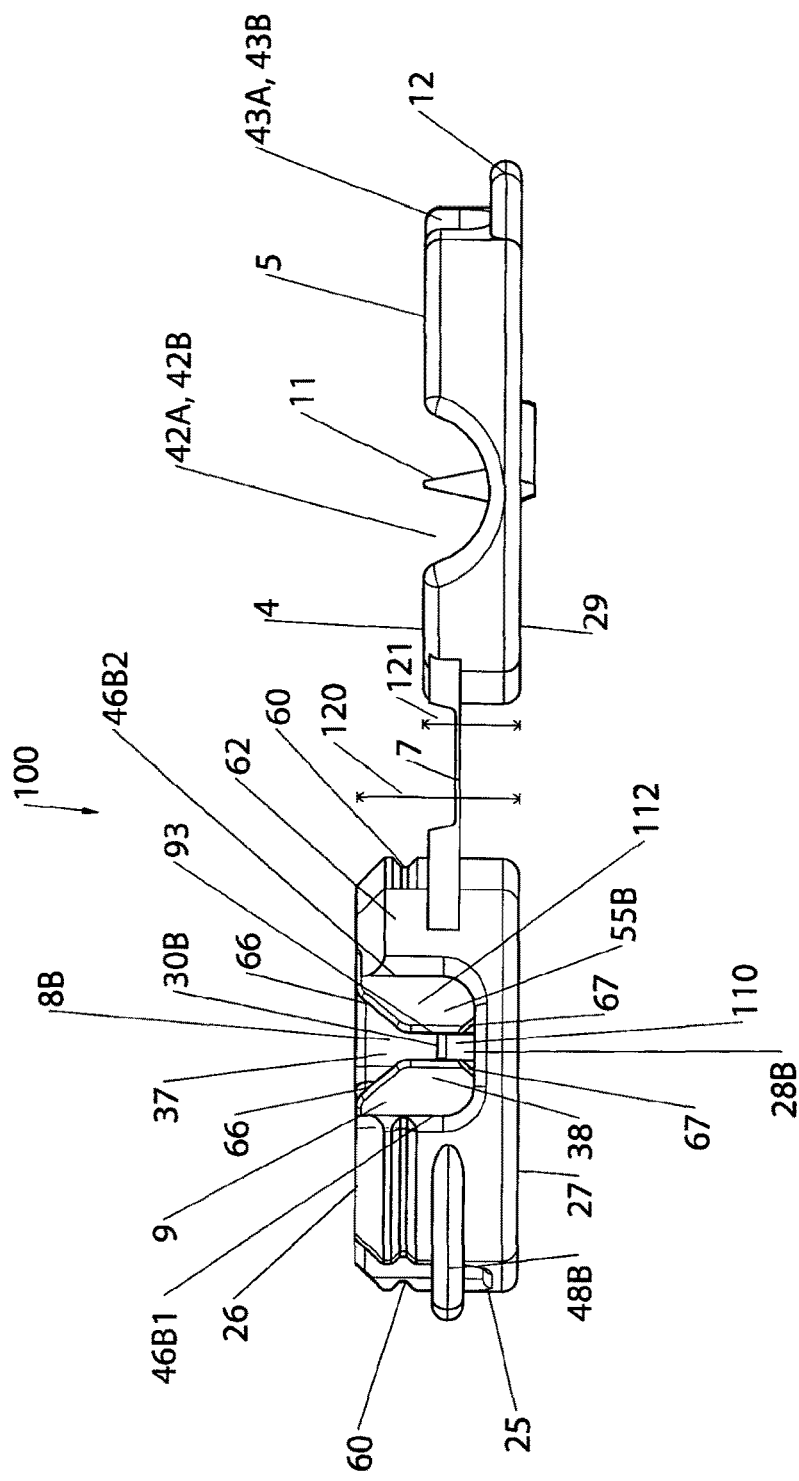
FIG. 11A shows a side view of the embodiment from FIG. 6 in the open position.
Figure 11B:
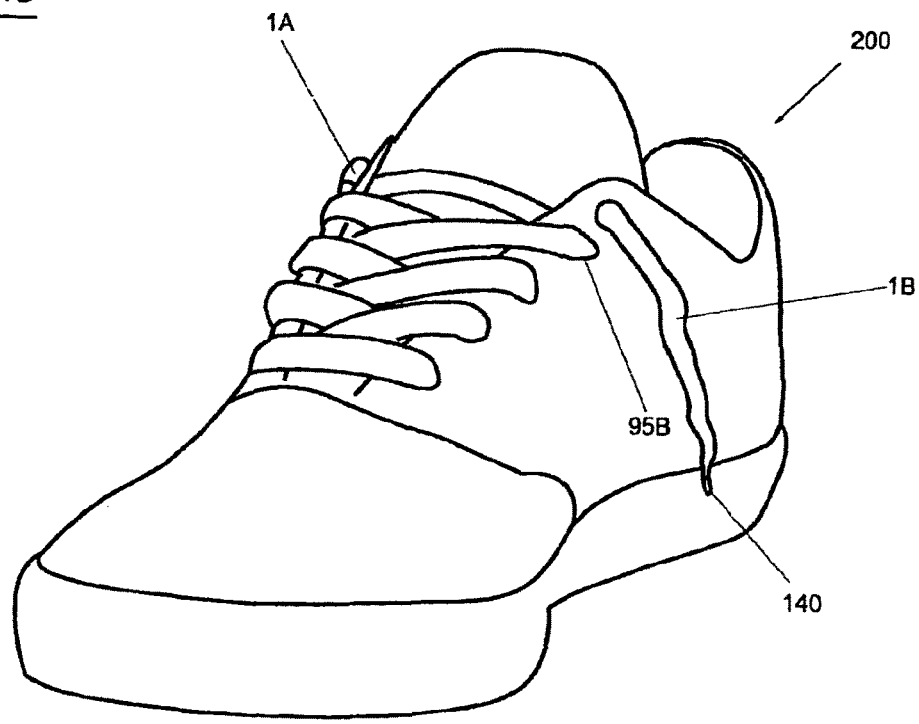

FIG. 11A shows that bridge parts 34A, 34B are not only recessed with respect to the top side of the base element 2, but are also recessed with respect to bridge parts 28A, 28B, which mark the transition between openings 3A, 3B and the insertion grooves 8A,8B. In other words, the depth 38 is greater than the depth 37. The insertion grooves 8A, 8B thus comprise an upper bottom part 28A, 28B and a lower bottom part 34A, 34B, or in other words a deeper part and a shallower part. The shallow part of the insertion grooves 8A, 8B is situated closer to the openings 3A, 3B than the deep part of the insertion grooves 8A, 8B.

This has the advantage that the laces are curved over an angle of more than 180 degrees around bridge parts 28A, 28B during use, i.e. around curve axes 105A, 105B. See in particular FIG. 11G which will be discussed below. During use, the pressure part 11 in the form of upright elements press the laces which come up through the holes 3A, 3B into the insertion grooves 8A, 8B.

This angle of more than 180 degrees and the friction between the lace and the bridge part 28A, 28B in themselves provide part of the grip which is required for clamping the lace securely.

The lace parts are situated in the device 100 in a plane which is at right angles to the top side 26.

Figure 10:
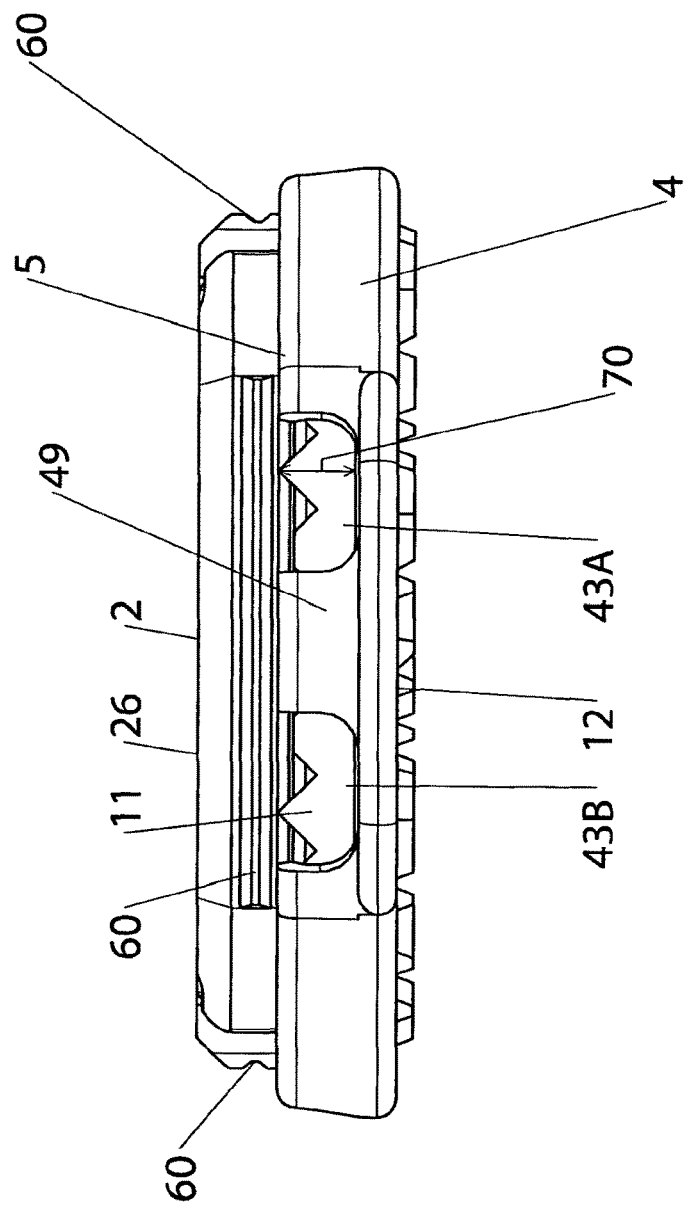
FIG. 10 shows a rear view of the embodiment from FIG. 6 in the open position.

Referring to FIG. 10, the height 70 of the upright elements 11 is so great that when the locking element is shut, the upright elements extend from the bottom side 31 of the locking element downwards near the bridge parts 28A, 28B and into the insertion grooves 8A, 8B.

In an embodiment, the upright elements together with the bridge parts 28A, 28B, 34A,34B are formed in such a manner that the lace parts are curved back again slightly, i.e. after the angle of 180 degrees, the lace parts curve slightly upwards, so that they have a concave shape in the insertion grooves 8A, 8B in top view (FIG. 6). This can be achieved by making the height 70 of the protruding parts relatively great and by recessing the bridge parts 28A, 28B, 34A, 34 over a relatively small depth.

FIG. 11A furthermore shows that the barb elements 9 are provided with sloping edges 66 on the top side. These sloping edges make it possible to press a lace downwards in a simple manner during use. The sloping edges 66 form guides for the laces, as it were.

Furthermore, the barb elements 9 which are situated closest to the bridge parts 34A, 34B have sloping edges 67 on the bottom side of the front edge 68. The sloping edges 67 prevent contact between the barb elements 9 and the bridge parts 34A, 34B.

Referring to FIG. 11A, the base element 2 has a groove 60 in the side wall 62. The groove 60 is formed in order to receive an inwardly protruding part 64 of the edge 5 of the locking element 4 therein, so that the locking element 4 is click-fitted onto the base element 2.

In an embodiment, the entire device 100 is integrally formed, thus facilitating production as no screws, adhesive connections or other means of attachments are required.

Application of Second Embodiment

Referring to FIGS. 11B, 11C, 11D, 11E and 11F, securing laces on a shoe 200 using the device according to the invention is illustrated. Tying starts with the shoe having loose laces, see FIG. 11B. The terms "string end" and "laces" are used interchangeably in this document. The string ends are regarded as the part of the laces which extends between the lace openings 95A, 95 and the far end 140 of the laces. There are two ways of using the device 100. In FIGS. 11B-11F, the right lace 1B shows the method with a bow and the left lace shows the method without a bow.

Figure 11C:
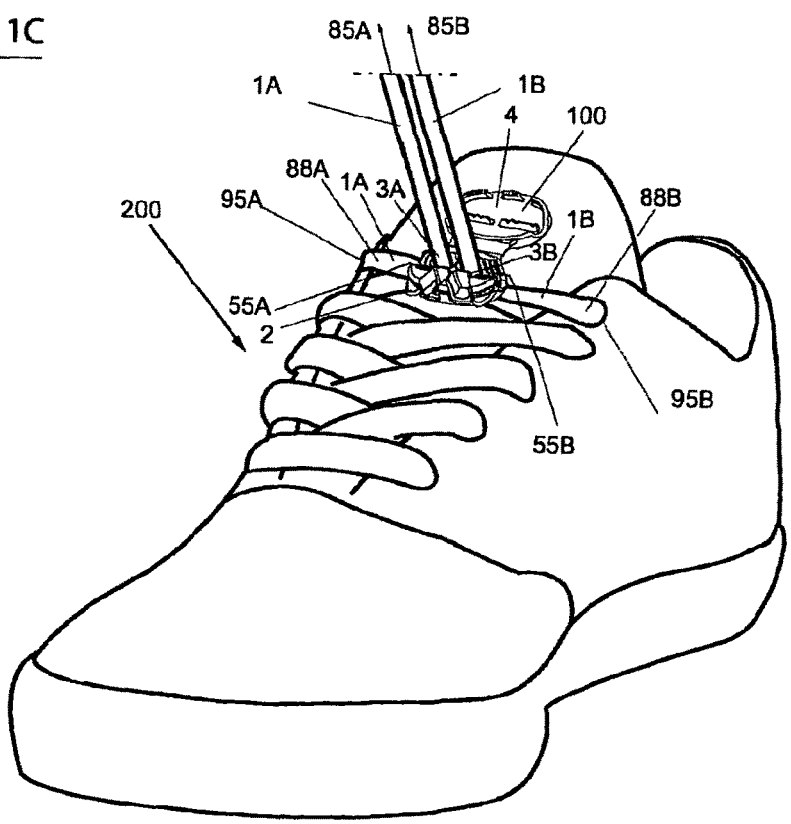
Figure 11E:
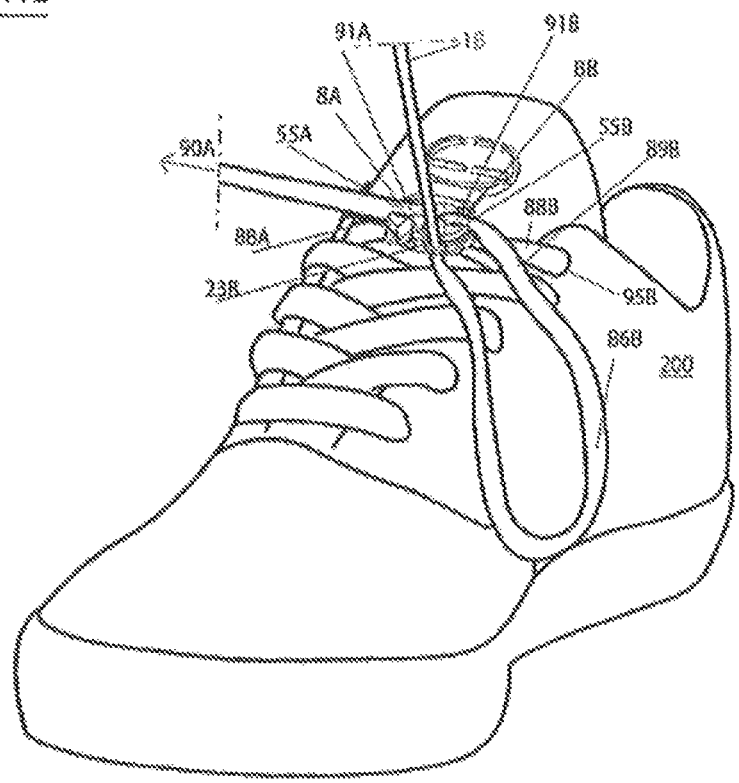

The ends 85A, 85B of the laces 1A, 1B are pushed through openings 3A, 3B from the bottom side of the device 100 upwards, see FIG. 11C.

Subsequently, see FIG. 11D, the laces 1A, 1B are inserted on one side into insertion grooves 8A, 8B. The laces 1A, 1B are then guided in a bow 86A, 86B back to the bottom side of the device 100 and pushed through openings 23A,23B from the bottom side upwards. The figures do not show bow 86A, but if both laces are tied in a bow, bow 86A will be present.

The part of the lace which extends through opening 23b and passage 57B is clamped less securely in the device 100 than the lace part 91B which is situated in the insertion groove 8B.

Subsequently, the ends 85A, 85B of the lace parts 1A, 1B are placed in the insertion grooves 24A, 24B, and the short, loose ends of the lace parts in this case protrude from the grooves 24A, 24B and from the openings 57A, 57B which are defined on the front side of the device 100.

Figure 11G:
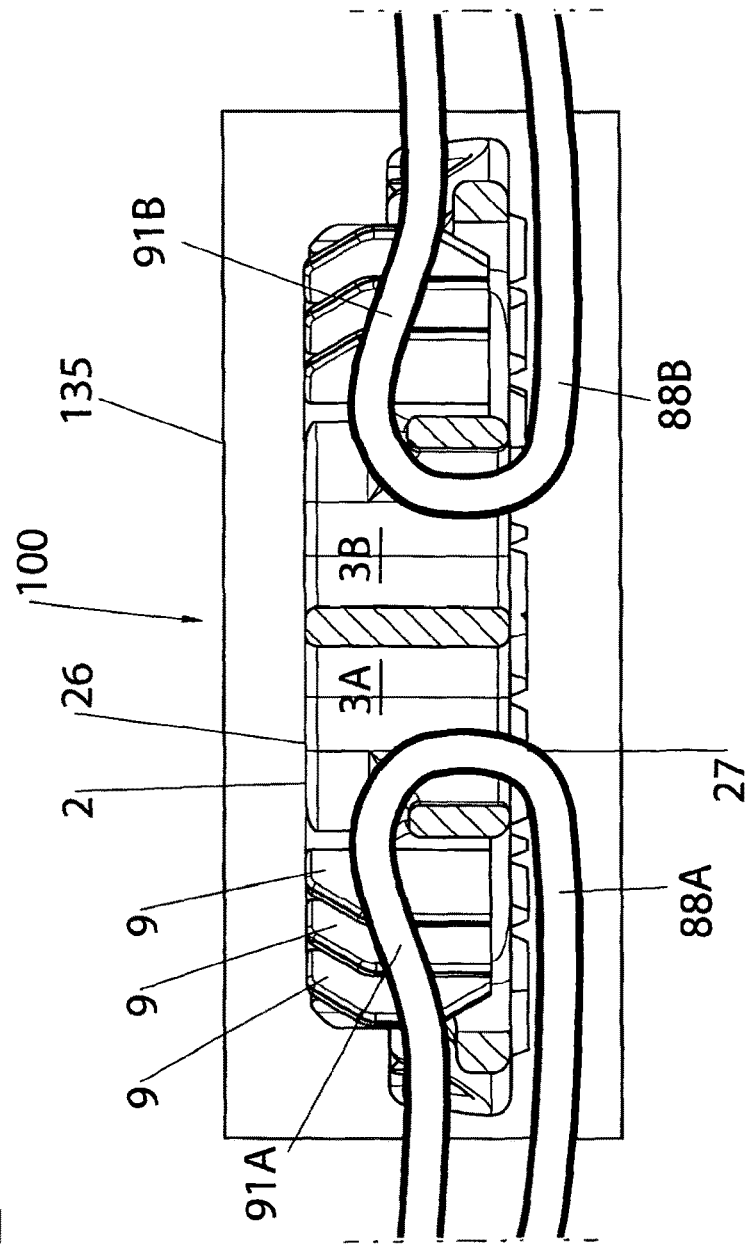
FIG. 11G shows a cross section of the embodiment from FIG. 6 during use.

Thereafter, the locking element 4 is shut and click-fitted, see FIGS. 11F and 11G. The lace parts 88A, 88B which extend underneath the base element 2, extend along the bottom side 27 of the base element 2 of respective lace openings 95A, 95B in the shoe up to the openings 3A, 3B. The lace parts come up through the openings 3A, 3B and describe a substantially U-shaped or C-shaped curve at the openings 3A, 3B, after which the lace parts extend away from one another as a result of insertion grooves 8A, 8B. Coming from the lace holes 95A, 95B in the shoe, the lace parts move towards one another, describe a U-shaped or C-shaped curve and move away from one another again. As a result of the shape of the bridge parts 28A,28B and the pressure part 11 in the form of projections, the lace parts describe a U-shaped curve of more than 180 degrees, i.e. a C-shaped curve. In the grooves 8A, 8B, the lace parts 91A, 91B curve back slightly, see FIG. 11G.

Tightening the laces can be achieved by taking a lace part 89A which comes from the opening 55A in one hand and taking a lace part 89B which comes from opening 55B in the other hand. By moving the hands apart, and exerting a force in the direction of arrows 90A, 90B, both lace parts are tightened. This is a simple operation, in which the lace parts 89A, 89B are in line with one another, i.e. extend substantially along one axis, and the hands, the lace parts and the device are in one line. This arrangement makes tightening easier. During pulling, the lace parts 89A, 89B extend approximately across the lace openings 95A, 95B, see FIG. 11D.

It is also possible to tighten the lace parts one by one. In this case, the device 100 or lace part 89A, 89B is held with one hand and a lace part which extends to the outside from opening 55A or 55B is in each case tightened with the other hand.

The lace parts 88A, 88B which extend on the bottom side 27 and the lace parts 91A, 91B which extend in the insertion grooves 8A,8B are substantially in a single straight plane 135 which extends at right angles to the top side 26 and bottom side 27, see FIG. 11G.

During lacing, the left lace 1A stays on the left and the right lace 1B on the right, which avoids confusion.

The bows make it possible to take off the shoe without the laces becoming entangled. When the shoe is taken off, the bows 86A, 86B are simply made smaller, as a result of which the shoe receives more lace and can be loosened, so that it can be taken off. After tightening, the bows are simply increased by pulling on parts 89A, 89B.

The device 100 is disposed loosely on the shoe, but may optionally be attached to the shoe, for example to a tongue. If desired, the attachment may be effected by means of a short string or flexible plastic element.

Protruding parts 48A, 48b of the base element are points of engagement for the fingers in order to be able to open and close the device.

FIG. 11F shows that the left lace 1A has been tied without a bow and the right lace 1B has been tied with a bow.

Third Embodiment

Referring to FIGS. 12-17, a third embodiment of the device 100 according to the invention is illustrated. The device 100 has a substantially circular base element 2 and a substantially circular locking element 4.

This embodiment has a single opening 3 in the base element 2 which is situated between two insertion grooves 8A, 8B. It is also possible to provide two openings 3A, 3B. The insertion grooves 8A, 8B extend substantially at right angles to a hinge pin 101 of the hinge 7. The insertion grooves 8A, 8B extend substantially from the centre of the base element 2 to the front side 25 and rear side 45 of the base element 2, respectively.

The insertion grooves are provided with serrated teeth (9) for retaining the lace. The serrated teeth diverge towards the top, for example into a V shape. In this case, the width of the gap increases towards the top. When the lace is pressed into the insertion groove 8A, 8B by the protruding elements, the lace will become more securely lodged as it is pressed deeper into the groove due to the narrowing shape of the insertion groove 8A, 8B.

An opening 74 is provided in an edge zone of the locking element 4, near the hinge 7. When the device is shut, the opening 74 is brought close to the outer end of insertion groove 8 and thus forms the passage opening for the lace to the outside.

The base element 2 comprises one or more thresholds 80 which are placed in the insertion grooves 8A, 8B and extend transversely to the insertion grooves 8A, 8B. The thresholds 80 have a sharp top edge and, in the closed position, cooperate with protruding parts 11 of the locking element 4 in order to retain the lace.

The locking element furthermore comprises a recess 42 in the edge 5. The recess is situated on the side which is situated furthest from the hinge 7. In the closed position of the locking element 11, the recess is situated above bridge part 34A, and cooperates with the latter in order to form a passage opening through which the other lace exits during use.

The opening 74 and the bridge part 34A together form an opening through which a lace extends to the outside during use.

The invention claimed is:

1. A device for connecting up two string ends which device comprises a base element which is configured such that the string ends can be introduced and at least one locking element which is configured for locking the string ends by cooperating with the base element,
   wherein the base element and the at least one locking element can be click-fitted together,
   wherein the base element has an insertion groove for each string end for inserting said string end, the device comprising at least one opening being situated between the two insertion grooves,
   wherein the insertion grooves are recessed with respect to a top side of the base element, wherein the insertion grooves are open at an upper side, wherein the two insertion grooves extend from a central region of the base element to a left side respectively a right side of the base element,
   wherein the two insertion grooves, in a view perpendicular to a top side of the base element, extend at an angle of less than 15 degrees with respect to one another,
   wherein the insertion grooves extend as far as a left and right side of the base element and, together with the locking element, define passages to an outside there, the passages forming recesses in respectively a left side wall and a right side wall of the base element,
   wherein each passage forms an outer end of an associated insertion groove and is defined between opposite side walls of the insertion groove at the end of the insertion groove, which opposite side walls of the insertion groove end at respectively the left and right side wall of the base element, wherein each passage is open at an upper side, allowing each string end to be inserted in a lateral direction of the string end downward into the insertion groove and into the passage and to extend outwardly from the left and right wall of the base element through the passage and out of the base element via the passage when the locking element is in a locked position, wherein the open upper sides of the insertion grooves allow the string ends to be lifted upwards out of the insertion groove in a lateral direction of the string ends when the locking element is in an open position, wherein said open upper side of the insertion grooves and of the passages is closed by the locking element when the locking element is in a locked position,
   wherein each of the two insertion grooves comprise means for preventing the string end from sliding in said insertion groove, wherein said means comprise one or more resilient serrated elements or one more resilient barb elements which are provided with sloping edges on the top side,
   wherein the one or more resilient serrated elements or one more resilient barb elements project toward one another from opposite side walls of the groove and form a gap between the one or more resilient serrated elements or one more resilient barb elements in which in use the string ends are held,
   wherein the at least one locking element has a pressure part which is configured to cooperate with the respective insertion groove in such a manner that the string end is pressed into said insertion groove and remains pressed into said insertion groove after the base element and locking element have been click-fitted together,
   wherein the pressure part comprises serrated or barb elements, for preventing the string end from sliding in said insertion groove, wherein when the locking element is closed the serrated or barb elements extend from a bottom side of the locking element downwards and into the insertion grooves and extend between the sloping edges of the one or more resilient serrated elements or one or more resilient barb elements which project toward one another from the opposite side walls of the grooves,
   wherein the at least one opening and the insertion grooves are formed in such a way that the string ends, during use, are curved around respective bridge parts which extend substantially parallel to the top surface of the base element,
   wherein the insertion grooves are formed in such a way that they accommodate the string ends during use, so that the string ends extend through the insertion grooves and are situated between the base element and the locking element.

2. The device according to claim 1, wherein the base element and the at least one locking element are hingedly connected to one another,
   in which the at least two insertion grooves, in a view perpendicular to a top side of the base element, extend at an angle of less than 10 degrees with respect to a hinge pin of a hinged connection between the base element and the locking element,
   in which curve axes extend substantially at right angles to the hinge pin,
   wherein at least a part of the insertion grooves has an open bottom, and in which the base element comprises at least two bridge parts which are recessed with respect to a top side of the base element, with the bridge parts forming a passage from the at least one opening to the respective insertion grooves,
   wherein the means for preventing the string ends from sliding in insertion grooves extend over a distance to below a bottom part of the insertion grooves.

3. The device according to claim 1 or 2, in which the openings and the insertion grooves and the locking element are formed such that, during use, the string ends are curved over an angle of more than 180 degrees.

4. The device according to claim 2, comprising four openings in the base element which are associated with four respective insertion grooves in the base element, wherein:
   two openings in the base element are associated with respective insertion grooves which extend from the respective openings to the side of the base element, and
   two openings in the base element are associated with respective insertion grooves which extend from the respective openings to a front side of the base element.

5. A Shoe, provided with the device according to claim 2.

* * * * *